Sept. 24, 1929.   C. G. OLSON   1,729,050
MILLING CUTTER
Filed July 8, 1926
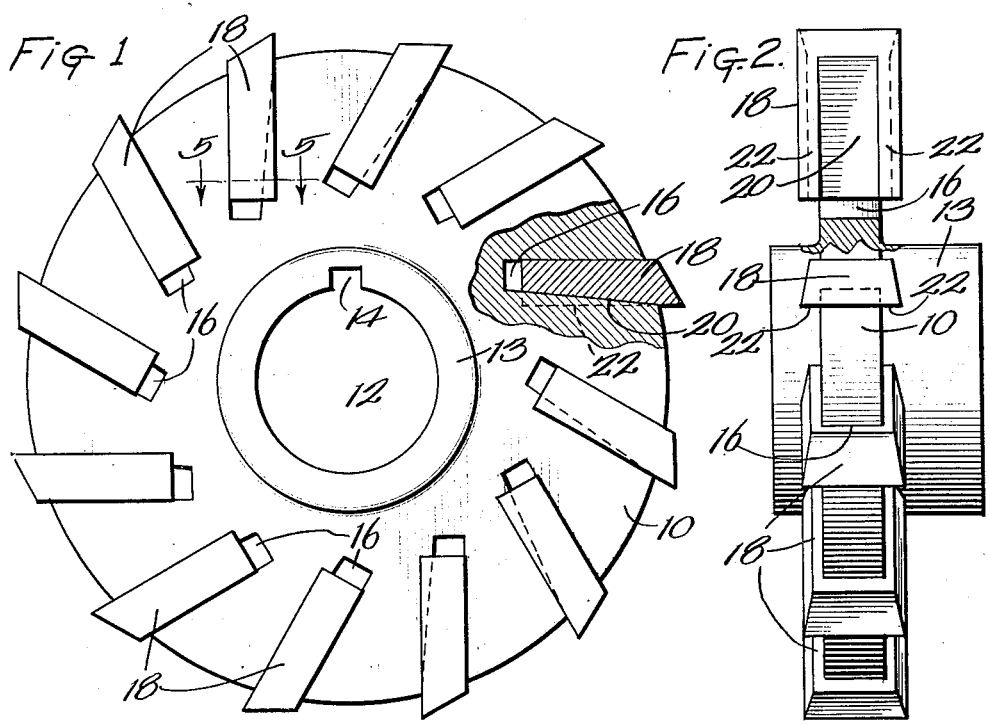
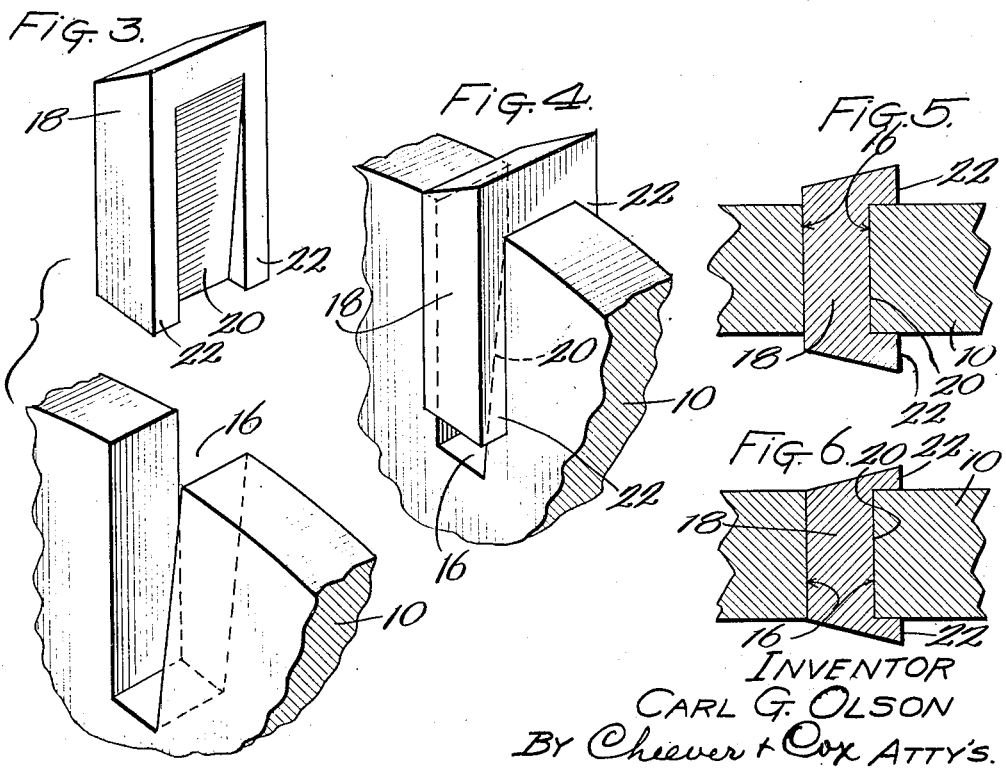
INVENTOR
CARL G. OLSON
BY Cheever + Cox ATTY'S.

Patented Sept. 24, 1929

1,729,050

UNITED STATES PATENT OFFICE

CARL G. OLSON, OF CHICAGO, ILLINOIS, ASSIGNOR TO ILLINOIS TOOL WORKS, OF CHICAGO, ILLINOIS, A CORPORATION OF ILLINOIS

MILLING CUTTER

Application filed July 8, 1926. Serial No. 121,069.

My invention relates to inserted tooth milling cutters, and one of the objects is to provide a tool having inserted teeth which require no additional parts for holding them in place, and in which the body is narrower than the teeth. Heretofore difficulty has been experienced in mounting teeth in a narrow mill body, and one of the purposes of the invention is to overcome this difficulty.

Another object of the invention is to provide a tool of this character in which the teeth are self-tightening so that the greater the thrust to which they are subjected the greater will be their security within the mill body.

A further object of the invention is to provide simple and efficient means for preventing sidewise movement of the cutter teeth in the body.

Still another object is to provide a construction such that the strength of the tooth is greatest near the cutting edges, thereby affording maximum strength for the amount of metal employed.

A still further object is to provide a construction both of the mill body and cutter teeth which lends itself readily to ordinary manufacturing methods. A further object is to so position the teeth that the cutting edges will be inclined toward the cut for free action. Further objects will become apparent as the description proceeds.

I accomplish my objects by the construction illustrated in the accompanying drawing in which Figure 1 is a side view of a complete cutter broken away at one point to better reveal the construction.

Figure 2 is an edge view of the cutter shown in Figure 1.

Figure 3 is an expanded view in perspective showing the relative constructions of the teeth and of the slotted disc into which they fit.

Figure 4 is a perspective view showing the parts of Figure 3 assembled.

Figure 5 is a sectional view on the line 5—5 Figure 1.

Figure 6 is similar to Figure 5 but shows a form in which the tooth is no wider at the back than at the body of the cutter.

Like numerals denote like parts throughout the several views.

According to the selected design, the body 10 is a disc having the usual center opening 12, hub 13 and keyway 14. In this respect the design may be considerably varied and various other bodies of revolution may be substituted.

The mill body or cutter body 10 has a plurality of slots 16, which may extend radially, but by preference are oblique so that the cutter teeth will extend obliquely forward in the cutting direction to promote free action. The slots are tapered or wedge shaped, being narrower at the inner end.

The cutter teeth 18 have straight sides, i. e. are formed from rectangular blocks and are of a width greater than the width of the cutter body, and project on both sides from it. A channel 20 is formed at the mid portion of the front of each tooth as best shown in Figure 3. It has a width equal to the width of the cutter body and is oblique at the bottom to conform to the taper of the slots. The portions of a tooth which border the channel thus form wings 22 which engage the sides of the cutter body and prevent sidewise movement of the teeth. It will be observed that these wings are on the forward face of the teeth, and that the portion of a tooth which projects beyond the periphery of the cutter body is of the full thickness of the block from which it is formed. By preference the slots 16 are deeper than the teeth which prevents the teeth from bottoming before they become tightly wedged in the cutter body.

The teeth are relieved both at the top or outer end and at the sides, that is, the teeth are shorter at the back than at the forward cutting edge and are narrower toward the back than at the front. It will be evident by referring to Figure 5 that the taper may be quite steep and that the back of the teeth may be obliquely cut away until they are no wider than the thickness of the cutter box.

In operation, the thrust caused by the reaction of the work against the cutter teeth forces the latter radially inward until they are tightly wedged in the cutter body, and the greater the resistance the greater will be the tendency to lock the teeth in place; hence the teeth are self-tightening. The wings 22 prevent any sidewise movement of the teeth and hence the teeth are very rigidly held and yet require no separate fastening devices such as pins, screws, wedges or the like. The configuration of the teeth and of the slots is simple and hence the parts may be readily produced by ordinary machine shop methods.

In Figure 6 I have shown a tooth which is no wider at the back than the body of the cutter. This illustrates one of the advantages of my invention and is made possible by the fact that the channeling of the tooth is located at the front instead of the rear of the tooth. Thus the strength is maintained, and at the same time a very narrow cutter becomes practical.

Attention is called to my copending application for milling cutter filed July 8, 1926, Serial No. 121,068.

Having thus described my invention what I claim as new and desire to secure by Letters Patent is:

1. A milling cutter having a plurality of inwardly extending and inwardly converging tapered slots, and blades projecting at both sides from the body and having at the front a tapered mid-portion under the cutting edge corresponding to the taper of and fitting into said slots, the projecting sides of the blades overlapping the side walls of the cutter body.

2. A milling cutter having a body of revolution with taper slots in the periphery converging inward, and blades inserted in the slots, said blades being wider than the body and having a front mid-portion under the cutting edge which is tapered to fit the slot, the sides of the blades overlapping the side walls of the cutter body.

3. A milling cutter tooth having front and back sides substantially parallel and having an angular depression in the front face such that the central portion of the cutter tooth is tapered in a direction away from the main cutting edge for the purpose of being held by wedge action in a cutter body, the sides of the cutter tooth being adapted to overlap the side walls of a cutter body.

4. A milling cutter having a body of revolution having slots in the periphery which are tapered and become narrower toward the center of the body, and cutting blades having channels at the center under the cutting edge, the bottom of the channels being oblique with respect to the side of the blades to produce a taper corresponding to the taper of the slots, and the channels having a width equal to the thickness of the cutter body whereby the portions at the sides of the channel form wings which overlap the sides of said body for preventing relative sidewise movement, the wings extending in the forward or cutting direction of the teeth.

5. A milling cutter having a disc-like body with inwardly converging slots arranged approximately radially at the periphery, and cutter teeth which are wider than the body and project on both sides from it, the teeth having channels at the front mid-portion tapered to fit wedgingly into the converging slots in the body, the sides of the teeth converging toward the back to produce relief and overlapping the side walls of the cutter body.

6. A milling cutter having a plurality of inwardly extending and inwardly converging tapered slots and blades projecting at both sides from the body and having a front flat tapered mid-portion corresponding to the taper of and fitting into said slots, the sides of the blades overlapping the side walls of the cutter body, the slots being deeper than the teeth to prevent the teeth from bottoming in the slots before they become tightly wedged in position.

7. A milling cutter having a plurality of inwardly extending and inwardly converging tapered slots and blades projecting at both sides from the body and having at the front a tapered mid-portion corresponding to the taper of and fitting into said slots, the tooth being no wider at the back than the body of the tool.

8. A milling cutter having a disc-like body formed with peripheral slots, said slots being tilted angularly with respect to a radial line passing through the axis of the cutter and the front edge of the slot, said slot having front and back wall portions converging inwardly of the cutter and a cutter tooth disposed in each slot, each tooth having front wall portions formed intermediate thereof to provide a taper corresponding to that of the slot whereby when the cutting edge of the tooth contacts with the work the tooth will wedge in tightly into its slot, the sides of the cutter teeth overlapping the side walls of the disc-like body.

9. A milling cutter having a disc-like body formed with peripheral slots converging inwardly, and a cutter blade mounted in each of said slots, the front and rear faces of said blades being substantially parallel with the exception of a mid-section of the blade which is tapered in accordance with the taper of the peripheral slots, whereby said blades are secured against outward and lateral displacement with respect to the cutter body.

In witness whereof, I have hereunto subscribed my name.

CARL G. OLSON.